United States Patent
Rey et al.

(10) Patent No.: US 7,036,069 B2
(45) Date of Patent: Apr. 25, 2006

(54) METHOD AND ENTITY OF PACKET LOSS DISTINCTION

(75) Inventors: Jose Luis Rey, Darmstadt (DE); Carsten Burmeister, Hamburg (DE); Rolf Hakenberg, Darmstadt (DE)

(73) Assignee: Matsushita Electric Industrial Co., Ltd., Osaka (JP)

( * ) Notice: Subject to any disclaimer, the term of this patent is extended or adjusted under 35 U.S.C. 154(b) by 511 days.

(21) Appl. No.: 10/355,230

(22) Filed: Jan. 31, 2003

(65) Prior Publication Data

US 2003/0149930 A1 Aug. 7, 2003

(30) Foreign Application Priority Data

Feb. 4, 2002 (EP) .................................. 02002553

(51) Int. Cl.
*H03M 13/00* (2006.01)

(52) U.S. Cl. ..................................................... 714/776
(58) Field of Classification Search ................ 714/746, 714/752, 776, 799, 811; 370/229
See application file for complete search history.

(56) References Cited

U.S. PATENT DOCUMENTS 5,850,406 A * 12/1998 Bes ............................ 714/811
5,974,028 A    10/1999 Ramakrishnan ............. 370/229
6,530,055 B1 *  3/2003 Fukunaga .................... 714/746
6,741,555 B1 *  5/2004 Li et al. ...................... 370/229

FOREIGN PATENT DOCUMENTS

WO        0197446        12/2001

OTHER PUBLICATIONS

European Search Report dated Jul. 9, 2002.
R. Balan, et al., TCP HACK; TCP Header Checksum Option to Improve Performance over Lossy Links, Proceedings IEEE INFOCOM 2001, vol. 1, Apr. 2001, pp. 309-318, XP002205173.
R. El-Marakby, et al., "Delivery of Real-time Continuous Media over the Internet", IEEE, Jul. 1997, pp. 22-26, XP010241315.

* cited by examiner

*Primary Examiner*—Shelly Chase
(74) *Attorney, Agent, or Firm*—Stevens, Davis, Miller & Mosher, LLP

(57) ABSTRACT

The present invention provides a method and apparatus for distinguishing between congestion and corruption losses during the transmission of data packets. The packet lost distinction is based on the evaluation of an error detection/correction code of each data packet and by detecting sequence numbers.

18 Claims, 5 Drawing Sheets

METHOD AND ENTITY OF PACKET LOSS DISTINCTION

FIELD OF THE INVENTION

The present invention relates to a method and an entity for distinguishing losses of data packets which are sent from a transmission source. The present invention is particularly intended for use at the end point of a packet data transmission connection in order to distinguish between different kinds of packet losses.

BACKGROUND OF THE INVENTION

Reliable transport protocols are used in packet switched networks in order to transmit data from a transmission source to a transmission destination. Protocols describe the formats of data packets exchanged between elements of the network, the actions taken on receipt of data packets and how to handle errors. Conventional transport protocols are devised for use with traditional networks comprising wire links and stationary hosts. Such protocols assume congestion in the network to be the primary cause for packet losses and unusual delays.

The main transport protocols used over IP networks are the user datagram protocol (UDP) and the transmission control protocol (TCP). The TCP sender uses cumulative acknowledgements it receives to determine which packets have reached the receiver and provides reliability by re-transmitting lost packets. The sender identifies the loss of a packet either by the arrival of several duplicate cumulative acknowledgements or the absence of an acknowledgement for the packet within a time out interval. TCP attends to packet losses by dropping its transmission window size before re-transmitting packets, initiating congestion control or avoidance mechanisms and breaking off its re-transmission timer. These measures result in a reduction in the load on the intermediate link, whereby controlling the congestion in the network.

When packets are lost in a network for reasons other than congestion, these measures result in an unnecessary reduction in end-to-end throughput and, thus, in transmission efficiency. Wireless links within the networks will be of increasing importance for future networks. Communication over wireless links is often characterized by high bit-error rates. TCP performance in such networks suffers from significant throughput degradation and very high interactive delays.

While TCP is used for reliable transmission of a stream of bytes, the user datagram protocol (UDP) is used for unreliable transmission. UDP only offers minimal service beyond those provided by the network layer protocol, namely a check sum for the data included in the packet. UDP does not include a sequence number and, thus, is not capable of detecting losses of packets. Typically, another protocol is used over UDP, for instance the real-time transport protocol (RTP). RTP provides end-to-end network transport functions suitable for applications transmitting real-time data, such as interactive audio and video. Those services include payload type identification, sequence numbering, time stamping and delivery monitoring. RTP typically runs on top of UDP in order to make use of its multiplexing and error detection services. Both protocols contribute in this way partly to the transport protocol functionality. The sequence numbers included in RTP allow the receiver to reconstruct the sender's packet sequence. But as the check sum is done by UDP and the corrupted packets are discarded by UDP, such corrupted packets contribute to losses seen by RTP.

TCP may also be combined with another protocol, for instance the Snoop protocol. The Snoop protocol monitors every packet that passes through the TCP connection in both directions and maintains a cache of TCP segments sent across the link that have not yet been acknowledged by the receiver. A packet loss is detected and a retransmission may be initiated without letting TCP know of any bit error losses. The disadvantage of such a solution is that all the wireless links on the path shall support this option. Such an approach consumes memory in all base stations and does not provide a proper end-to-end solution.

Preferably, the response of a reliable transport protocol should, after detecting a packet loss, vary according to the kind of loss. If a data packet is lost due to congestion, the transmission source should reduce its sending bit rate. A congestion loss indicates that at least one network element (i.e. IP router) receives more data packets than it is able to deliver. Received data packets are fed into a queue. As the queue is filled with received packets, further incoming packets are discarded. In order to guarantee a reliable data packet transmission, the number of data packets buffered in the queue in a network element has to be reduced. This is achieved by reducing the sending bit rate of all applications according to a predetermined mechanism, called congestion control.

If a data packet has been lost due to data corruption, a reduction of the sending bit rate does not result in a bit error free transmission. Only the use of an increased sender forward error correction (FEC) coding may achieve a reliable, error free data transmission.

Alternatively, lost data packets may be re-transmitted. The re-transmission of lost packets results in an increased sending bit rate. Thus, a re-transmission of data packets should only be initiated in a case of packet losses due to bit errors and not due to congestion.

SUMMARY OF THE INVENTION

It is the object of the present invention to provide a method and an apparatus for distinguishing packet losses in data transmission networks.

This is achieved by the features of claim 1 for a method of distinguishing packet losses and by the features of claim 12 by a data packet loss distinction entity.

According to the present invention, at a transmission destination of data packet losses of data packet are analyzed whether to be based on congestion or on data corruption. For that purpose, each transmitted data packet is sent with a checksum and a sequence number. A distinction between different kinds of losses is made based on a detection of a failing checksum or on the detection of a missing sequence number. A loss due to congestion is only indicated if a missing sequence number but no bit error is detected for that data packet.

The distinction is preferably performed on the application level. The distinction between congestion and corruption losses makes it possible to initiate appropriate measures for adapting the transmission to the general transmission characteristics. For instance, the sending bit rate may be increased if corruption losses are detected and the sending bit rate may be decreased if congestion loses are detected. Preferably, appropriate measures increase the network stability by controlling congestion in the network and increasing the transmission performance by compensating bit errors to some extent.

According to a preferred embodiment, the numbers of detected packet losses are counted separately for each type of packet loss. Based on such data packet loss statistics, appropriate measures may be determined in an optimal manner.

The appropriate measures may be determined at the receiver's side or at the sender's side. When the determination of appropriate measures is performed at the sender's side, the packet loss statistics is transmitted to the sender.

Preferably, the sequence number is transmitted with increased error protection, for instance by increasing the forward error correction coding rate of the packet header over wireless links. Thus, the receiver will be able to always extract a sequence number, even if the data of the received packet are corrupted. When extracting a sequence number from each received data packet, a detected kind of packet loss may be assigned to each of the data packets separately. A particular "receiving status" may be assigned to each sequence number to indicate whether the packet has been received correctly, has been received with corrupted data, or has been lost due to congestion.

According to a further embodiment of the present invention, the packet loss distinction is applied to a transport protocol not using particular sequence numbers. Then, sequence numbers are inserted into the payload of the employed transport protocol. Thus, the packet loss distinction may be handled on the application level.

BRIEF DESCRIPTION OF THE DRAWINGS

Further features and advantages of the present invention will become apparent from the following and more particular description of the various embodiments of the invention, as illustrated in the accompanying drawings.

DETAILED DESCRIPTION OF THE INVENTION

The illustrated embodiments of the present invention will now be described with reference to the drawings.

Figure 1:
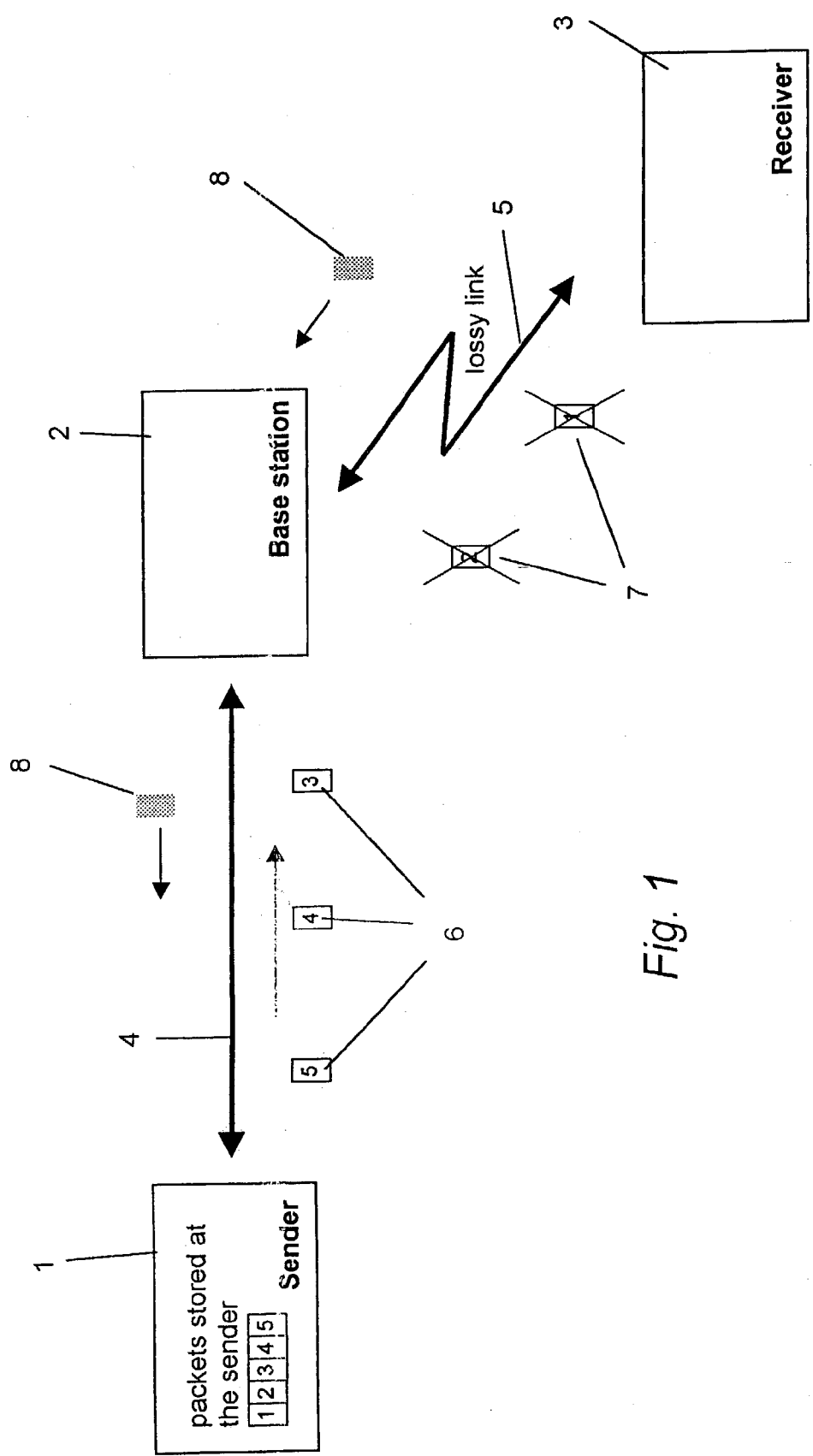
FIG. 1 shows a typical loss situation over a wireless link.

FIG. 1 illustrates the configuration of a typical loss situation over a wireless link included in the network. A data transfer between a sender 1 and a receiver 3 is performed via base station 2. The data transfer between sender 1 and base station 2 uses a wire link 4. The data transmission between base station 2 and receiver 3 is performed across a wireless link 5.

Reliable transport protocols perform well in conventional networks where packet losses occur mostly because of congestion. However, networks as shown in FIG. 1 with wireless and other lossy links also suffer from significant loss due to bit errors.

As shown in FIG. 1, the sender's congestion window consists of five data packets. The transmission of these five data packets 6, 7 is under way. The data packets transmitted over error prone link 5 got corrupted during the wireless transmission. Acknowledgements 8 are returned from the receiver to the sender.

In order to reduce the complexity of packet networks, the functionality of the overall network is separated into protocol layers. Protocols describe the formats of packets exchanged between elements of the network, the actions taken on receipt of packets and how to handle errors. A packet consists of an initial set of bytes, the header, that controls operation of the layer and the reminder of the packet which is passed unchanged to the next layer, called payload or data.

Figure 2:
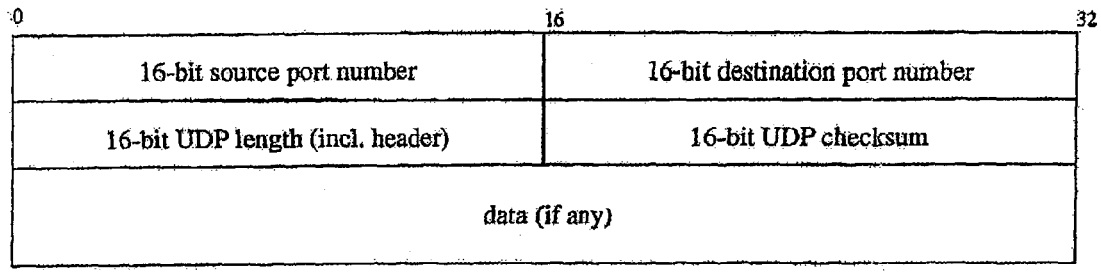
FIG. 2 illustrates the user datagram protocol (UDP) packet header format.

The main transport protocols used over IP networks are the user datagram protocol (UDP) and the transmission control protocol (TCP). An example for the packet header format of UDP is shown in FIG. 2. As can be seen from FIG. 2, the UDP header includes a sixteen-bit UDP check sum.

Figure 3:
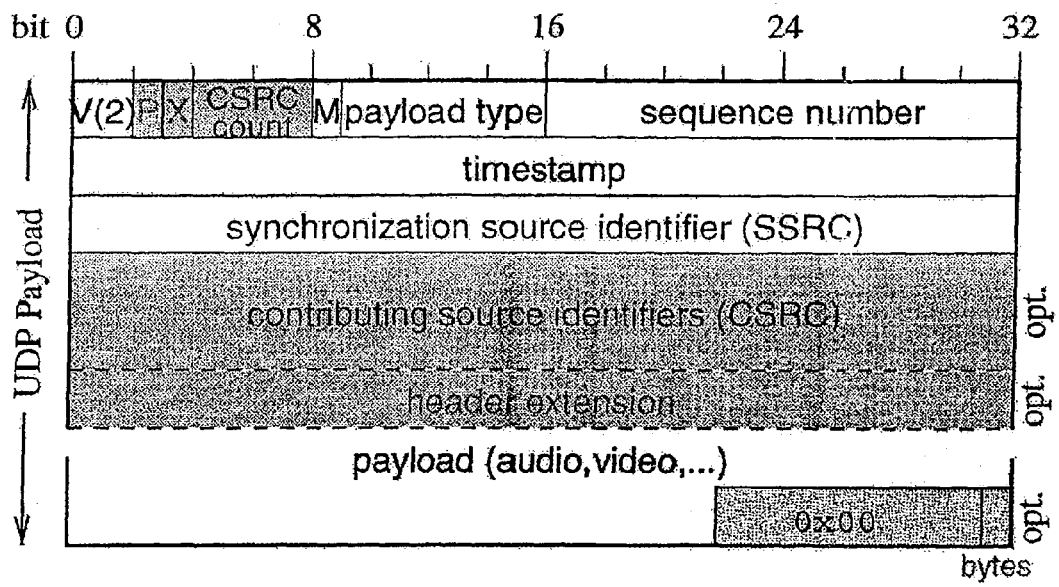
FIG. 3 shows the real-time transport protocol (RTP) header format.

The user datagram protocol (UDP) is generally used in conjunction with the real-time transport protocol (RTP). The configuration of the RTP header being inserted into the UDP payload is shown in FIG. 3. The V field indicates a protocol version. The X flag indicates the presence of a header extension between the fixed header and the payload. If the P bit is set, the payload is padded to ensure proper alignment for encryption. User's within a multi cast group are distinguished by a random 32-bit synchronization source SSRC identifier. The payload type identifies the media encoding used in the packet. The sequence number increments sequentially from one packet to the next and is used to detect losses and to determine the packet order. The time stamp being incremented with the media sampling frequency indicates when the media frame was generated.

Figure 4:
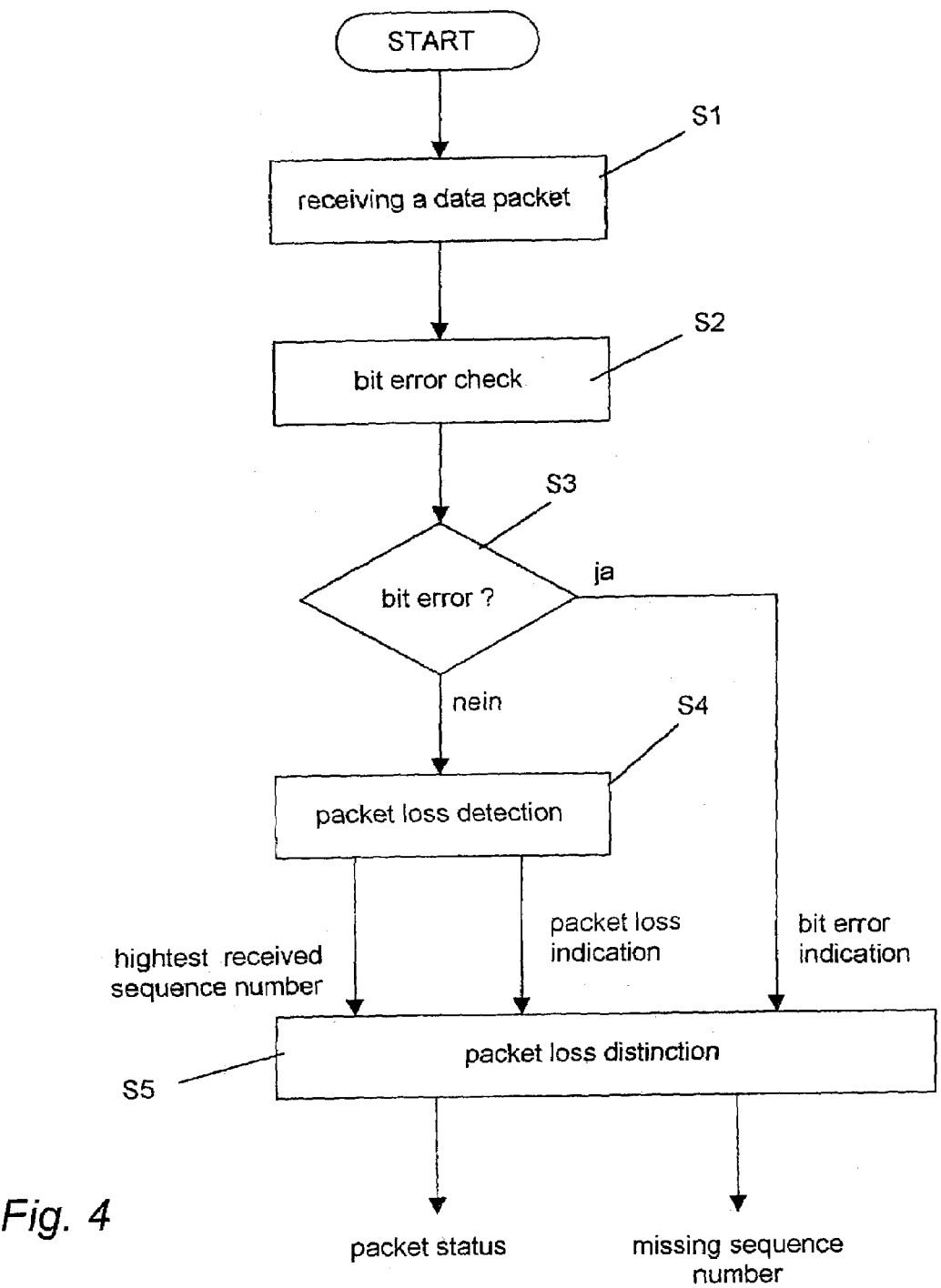
FIG. 4 is a flow-chart illustrating the packet loss distinction procedure according to the present invention.

FIG. 4 outlines the procedure of loss distinction of data packets at the receiver. After a data packet has been received (step S1), a bit error check is performed. In case a bit error or data corruption is detected (step S3), the procedure proceeds to step S5. In case it has been determined that the received data are not corrupted, the procedure proceeds to step S4 for a packet loss detection.

The packet loss detection step S4 extracts the sequence number of the received data packet. Based on the extracted sequence number, step S4 determines whether data packets are missing in the sequence of extracted sequence numbers. The packet loss detection step S4 transmits to step S5 whether or not a packet loss has been detected and the highest received sequenced number. Based on this information, the packet loss distinction step S5 determines the number of packet losses due to bit errors and due to congestion.

If corrupted data have been detected for a particular received data packet (step S3), the packet loss distinction step indicates a packet loss due to data corruption.

In case the packet loss detection step S4 indicates that data packets are lost, step S5 determines based on the highest received sequence number the number of missing data packets. This number is reduced by the number of detected corrupted data packets. Finally, packet loss distinction step S5 provides the packet status, i.e. whether a packet has been received correctly, lost due to corruption or lost due to congestion, and the sequence number of data packets lost due to congestion.

Alternatively, the sequence number may be extracted for each data packet, in particular when the sequence number is transmitted with increased error protection. In this case, the packet loss distinction step S5 will be able to assign to each sequence number a particular packet status, namely to be received correctly, to comprise corrupted data or to be lost due to congestion.

Figure 5:
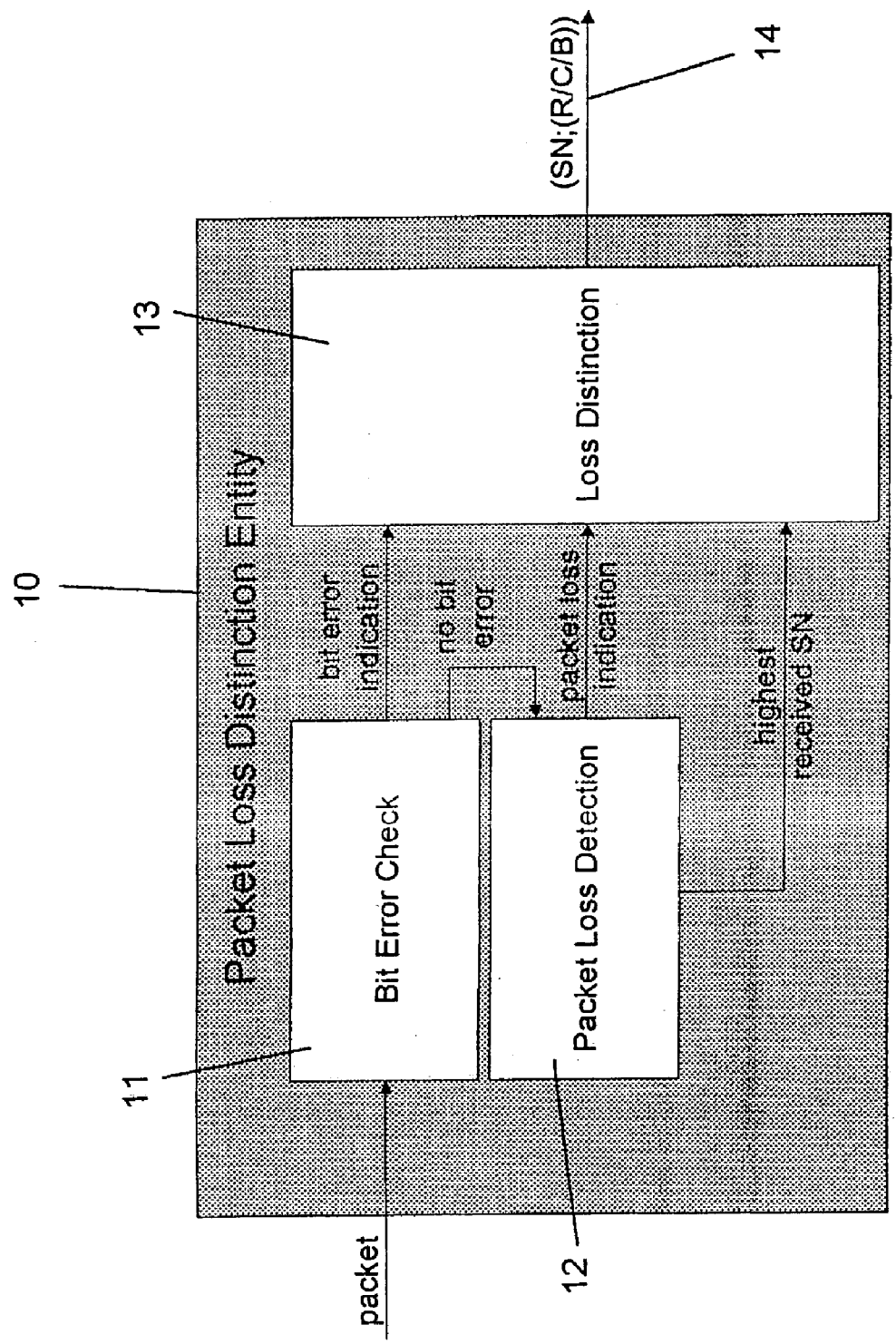
FIG. 5 is a block diagram illustrating the configuration of a packet loss distinction entity according to the present invention.

FIG. 5 shows the configuration of a packet loss distinction entity according to the present invention. The packet loss distinction entity comprises a bit error check unit 11, a packet loss detection unit 12 and a loss distinction unit 13.

A received packet is first supplied to the bit error check unit 11. The bit error check unit 11 determines whether the data of the data packet are corrupted during transmission. This is typically done by evaluating an error detection code transmitted within the data packet, e.g. a check sum or a CRC. Such error detection codes are inserted at the sender and verified at the receiver's side.

Error detection techniques allow a receiver to determine when a message has been corrupted during transmission through a noisy or error prone channel. This is typically done by having the transmitter calculate a value (often known as check sum) based on the message to be transmitted. This check sum is then appended to the message to be transmitted. The receiver can re-calculate this check sum as the message is received and compared to the transmitted check sum to determine if there were any errors during transmission. Traditional check sum calculations use simple summing formulas. Another popular type of redundant encoding are cyclic redundancy codes (CRC).

The detection result of the bit error check unit 11 is provided to the loss distinction unit 13. In case it has been determined that the received data packet has been received correctly, the data packet is forwarded to the packet loss detection unit 12.

Packet loss detection unit 12 evaluates sequence numbers to detect data packet losses. If a packet loss is detected, the packet loss is indicated to the loss distinction unit 13 together with the corresponding sequence number. In addition, the highest extracted sequence number of a received data packet is supplied to the loss distinction unit 13.

The loss distinction unit 13 combines all the information in order to evaluate if a data packet has been received correctly, has been lost due to congestion or has been lost due to bit errors.

If the "highest received sequence number" is received from the packet loss detection unit, all sequence numbers beginning from the sequence number following the last processed sequence number to the highest received sequence number are classified according to the following processing scheme:

(a) If the bit error detection result indicates that there are no bit errors in the data packet, the received data packet is signaled to be received correctly (R).

(b) If the bit error detection result indicates that the received data packet has been corrupted, the data packet is signaled to be corrupted (B). The loss distinction unit 13 also delivers the sequence number contained in the corrupted data packet—if extracted, although this information might not be fully reliable.

(c) If there is no bit error detected in the received data packet, but the packet loss detection unit indicates the packet to be lost, the data packet is signaled to be lost due to congestion (C).

The described procedure enables to distinguish packet losses during data transmission and to provide information on the kind of data loss. Such information may be employed, for instance, for filtering out bit error losses or/and for initiating appropriate measures in order to increase the transmission efficiency.

When data packets are corrupted during transmission, the forward error correction (FEC) coding rate should be increased in order to adapt the FEC coding level to the channel characteristics. The FEC may be increased at the transmission source in order to improve the end-to-end connection data packet throughput. Alternatively, the FEC coding rate on the wireless link may be increased as the wireless link is the most error-prone portion of the end-to-end connection.

When data packets get lost due to congestion, the congestion control of the transmission protocol should be invoked in order to adapt the transmission rate of data packets to the channel characteristics.

For a reliable operation of the present invention, data packets being corrupted should not be discarded before being sent to the packet lost distinction entity according to the present invention. Only when all packets are forwarded to the packet lost distinction entity, is it possible to determine reliably that non-received packets are actually lost due to congestion. In the internet, there might be bit errors introduced by intermediate links. Routers in the internet may detect these corrupted data packets and discard these packets. Especially bit errors in the IP header may be discarded when a router checks the IP check sum calculated over the IP header.

As the probability of corrupted data packets discarded before reaching the end point is rather low during data transmission in the internet, such packet losses may be neglected compared to congestion losses in the internet or compared to bit errors introduced by wireless links.

In addition, bit errors usually affect the payload of a data packet as the header size is rather small compared to the size of the payload. The bit error probability may be further reduced by applying unequal error protection to a data packet, i.e. to transmit the header with increased protection compared to the error protection of the payload. For this purpose, the forward error correction coding rate on the wireless link may be increased for the header as the wireless link is the most error-prone portion of the end-to-end connection. Alternatively, the error protection of the header may be increased for the complete end-to-end connection at the sender's side.

In a receiver, corrupted data packets should not be discarded before being provided to the packet loss distinction entity according to the present invention. For this purpose, the packet loss distinction entity is preferably placed before or in parallel to the transport protocol providing the bit error check. Alternatively, the bit error check of the transport protocol may be switched off.

In order to reliably detect packet losses, the present invention needs to evaluate a sequence number for each of the data packets. The packet loss distinction entity of the present invention may access for this purpose a sequence number inserted by any of the other protocols, e.g. RTP. Alternatively, the present invention may insert an own sequence number at the transmission source 1, preferably in the payload of a data packet.

Figure 6:
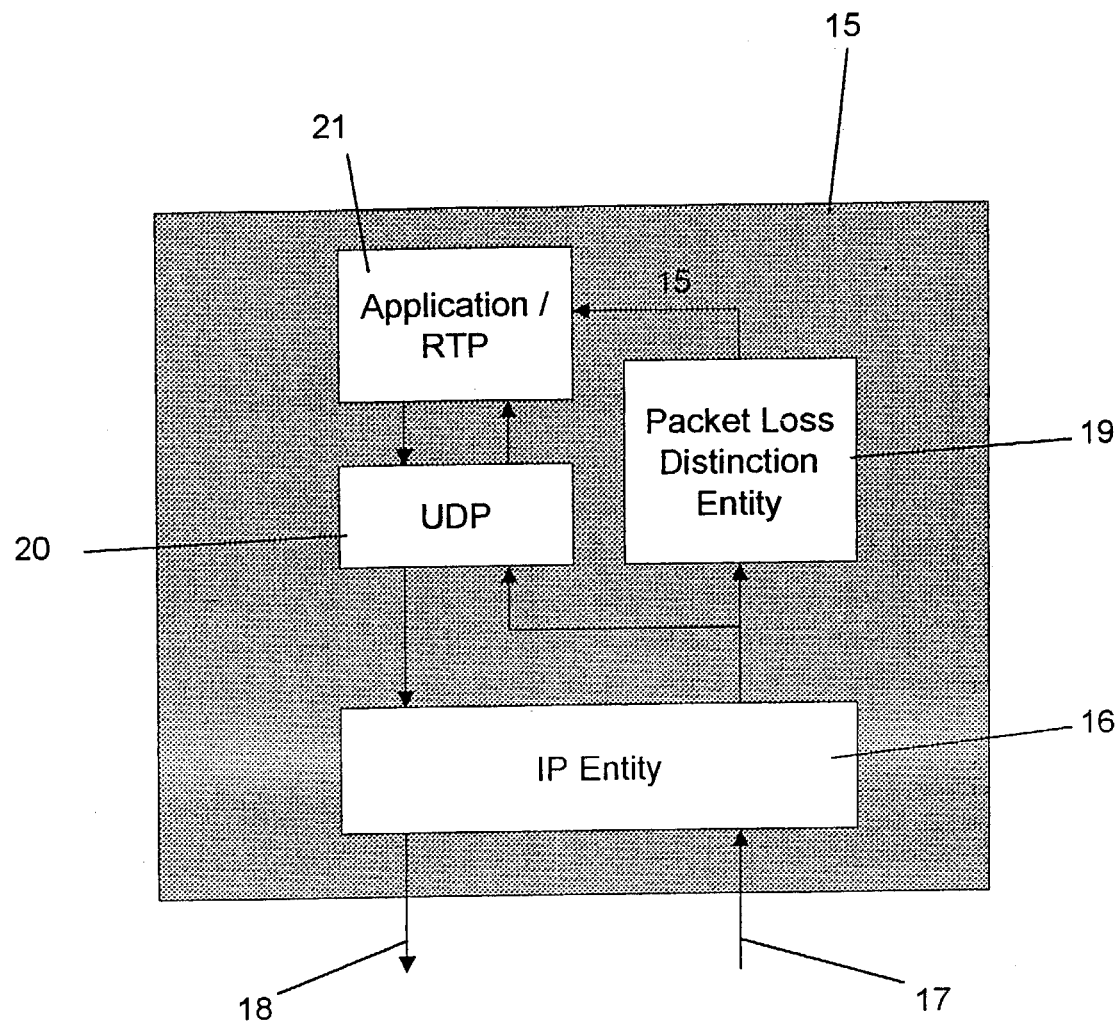
FIG. 6 is a block diagram illustrating a configuration of a transmission destination including the packet loss distinction entity of the present invention.

FIG. 6 shows a typical configuration of a receiver of data packets according to the present invention. The receiver comprises an IP entity 16 including input and output connections 17, 18. Data packets are first received by the IP entity 16. The IP entity 16 verifies the IP checksum of the received data packet forwards the received data packet to the UDP entity 20 and, additionally, forwards a copy of the received data packet to the packet loss distinction entity 19.

The UDP entity 20 verifies it's own check sum and discards packets comprising corrupted header data. Only uncorrupted data packets are supplied to the application 21 indicated by the corresponding port number included in the data packet.

The packet loss distinction entity 19 determines for each of the received data packets whether the data has been corrupted or a packet is lost due to congestion. The UDP check sum is used for detecting bit errors. The RTP sequence numbers are preferably used to detect packet losses. For each RTP sequence number belonging to the application specified by the UDP port, the packet lost distinction entity 19 specifies whether or not a data packet has been received correctly, whether a data packet is corrupted or whether a data packet is lost due to congestion.

As those skilled in the art will appreciate, the present invention is not restricted to the use of a particular protocol or a particular combination of protocols. The protocols are only used to describe examples for employing the present invention.

The application 21 receives from the packet loss distinction entity 19. The reception status of each sent data packet. This information may be evaluated to provide packet loss statistics to the sender or to an evaluation stage within the application, for instance, for determining appropriate measures. The sender (or the application) may determine appropriate measures to increase the transmission efficiency/network stability. For instance, the sender forward error correction coding rate may be increased if bit errors are reported. In case of reported congestion losses, the sending bit rate may be reduced.

The present invention provides a method and apparatus for distinguishing between congestion and corruption losses during the transmission of data packets. The packet lost distinction is based on the evaluation of an error detection/correction code of each data packet and by detecting sequence numbers.

The invention claimed is:

1. A method for distinguishing losses of data packets sent from a transmission source, the sent data packets comprise an error detection code and a sequence number inserted at the transmission source, the method comprises the steps of: detecting data corruption of a received data packet based on the error detection code of the received data packet, extracting the sequence number of a received data packet, detecting missing sequence numbers based on a sequence of extracted sequence numbers, indicating a data packet loss due to data corruption if a corrupted data packet has been detected, and indicating a data packet loss due to congestion if a missing data packet has been detected and if data corruption has not been detected for that data packet.

2. A method according to claim 1, further comprising the step of counting the number of corrupted data packets and the number of data packets lost due to congestion.

3. A method according to claim 1, further comprising the step of transmitting the detected kind of a data packet loss to the transmission source.

4. A method according to claim 3, further comprising the step of transmitting the counted numbers to the transmission source.

5. A method according to claim 1, further comprising the steps of determining appropriate measures for increasing the transmission efficiency, and transmitting the determination result to the transmission source.

6. A method according to claim 5, wherein the determining step determines to reduce the transmission rate if the number of congestion losses exceeds a first predetermined threshold.

7. A method according to claim 6, wherein the determining step determines to increase the error protection for data packets to be transmitted if the number of data packets lost due to data corruption exceeds a second predetermined threshold.

8. A method according to claim 5, wherein the determining step determines to increase the error protection for data packets to be transmitted if the number of data packets lost due to data corruption exceeds a second predetermined threshold.

9. A method according to claim 1, wherein the sequence number of each data packet is transmitted with increased error protection.

10. A method according to claim 9, further comprising the steps of assigning one of the following receiving states to each of the sent data packets: received correctly, received corrupted or lost due to congestion.

11. A method according to claim 9, wherein the sequence number is extracted from the payload of each data packet.

12. A method according to claim 9, wherein the sequence number of the RTP protocol is extracted.

13. A method according to claim 1, wherein the sequence number is extracted from the payload of each data packet.

14. A method according to claim 1, wherein the sequence number of a RTP protocol is extracted.

15. A data packet loss distinction entity for distinguishing losses of data packets sent from a transmission source, the data packets sent include an error detection code and a sequence number inserted at the transmission source, comprising:
   a bit error check unit for detecting data corruption of a received data packet based on the error detection code of the received data packet,
   a packet loss detection unit for extracting a sequence number from the received data packet and for detecting missing sequence numbers in the sequence of extracted sequence numbers, and
   a loss distinction unit for indicating a data packet loss due to data corruption if a corrupted data packet has been detected by said bit error check unit and for indicating a data packet loss due to congestion if a missing data packet has been detected by said packet loss detection unit and if data corruption has not been detected for that data packet by said bit error check unit.

16. A data packet loss distinction entity according to claim 15, wherein the indications of the loss distinction unit are supplied to an application for initiating appropriate measures for increasing a network stability based on the provided indications from the loss distinction unit.

17. A data packet loss distinction entity according to claim 16, wherein loss statistics are transmitted to the transmission source.

18. A data packet loss distinction entity according to claim 15, wherein loss statistics are transmitted to the transmission source.

* * * * *